(12) United States Patent
Trivini

(10) Patent No.: US 7,657,969 B2
(45) Date of Patent: Feb. 9, 2010

(54) HUBLESS CASTOR WHEEL CONSTRUCTION, PARTICULARLY FOR FURNITURE ARTICLES

(75) Inventor: Ruggero Trivini, S. Angelo Lodigano (IT)

(73) Assignee: O.G.T.M. - Officine Meccaniche S.r.l., S. Angel Lodgiano (Lodi) (IT)

( * ) Notice: Subject to any disclaimer, the term of this patent is extended or adjusted under 35 U.S.C. 154(b) by 286 days.

(21) Appl. No.: 11/411,288

(22) Filed: Apr. 26, 2006

(65) Prior Publication Data

US 2007/0143958 A1    Jun. 28, 2007

(30) Foreign Application Priority Data

Dec. 23, 2005    (IT) .......................... MI2005A2484

(51) Int. Cl.
*B60B 33/00* (2006.01)
(52) U.S. Cl. ................................. 16/45; 16/35 R; 16/37
(58) Field of Classification Search ................ 16/45, 16/46, 30, 35 R, 37, 31 R, 31 A, 40, 43
See application file for complete search history.

(56) References Cited

U.S. PATENT DOCUMENTS

| 4,045,096 | A | * | 8/1977 | Lidov ........................... 305/7 |
| 5,248,019 | A | * | 9/1993 | Sbarro ........................ 180/219 |
| 5,419,619 | A | * | 5/1995 | Lew ........................... 301/5.1 |
| 5,988,323 | A | * | 11/1999 | Chu ........................... 188/1.12 |
| 6,532,624 | B1 | * | 3/2003 | Yang ........................... 16/35 R |
| 6,834,746 | B1 | * | 12/2004 | Lin ........................... 188/1.12 |
| 6,839,939 | B2 | * | 1/2005 | Donakowski .................. 16/45 |
| 2002/0070514 | A1 | * | 6/2002 | Costa et al. ............ 280/11.226 |
| 2005/0115021 | A1 | * | 6/2005 | Tsai ........................... 16/31 R |

* cited by examiner

*Primary Examiner*—Victor Batson
*Assistant Examiner*—Jeffrey O'Brien
(74) *Attorney, Agent, or Firm*—James V. Costigan; Hedman & Costigan, P.C.

(57) ABSTRACT

An improved hubless castor wheel construction, particularly for a furniture article and the like, comprises a rotary element which is pivotably supported by a support element to be associated with a furniture article, said support element comprising two half-shells which can be coupled to locking means and are designed for defining an upright which can be engaged with connecting means to be connected to the furniture article, and an annular attachment for said rotary element.

3 Claims, 7 Drawing Sheets

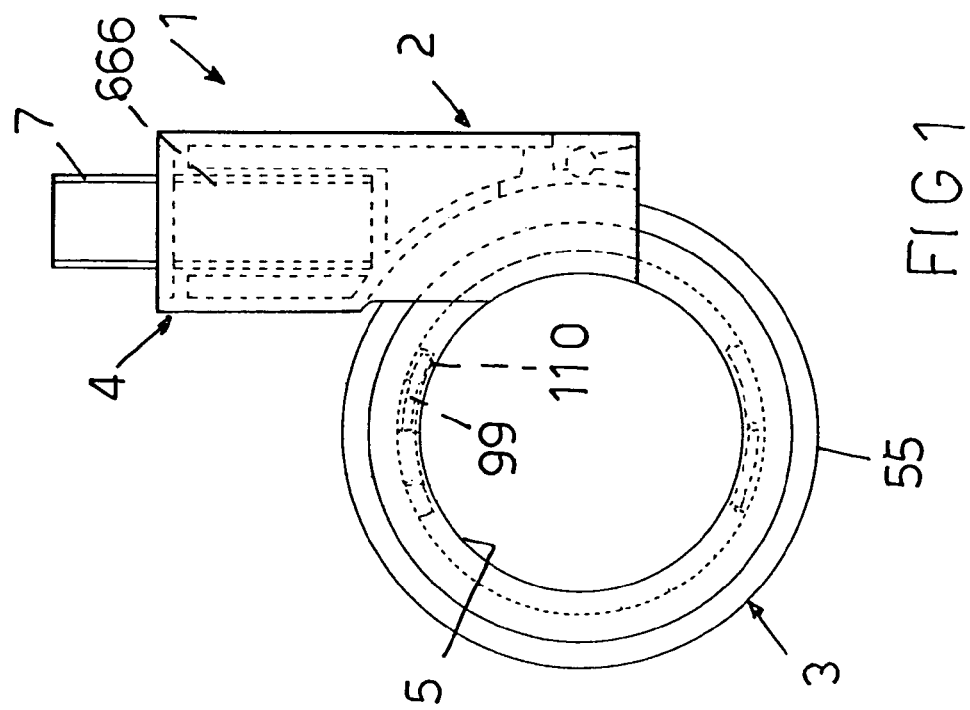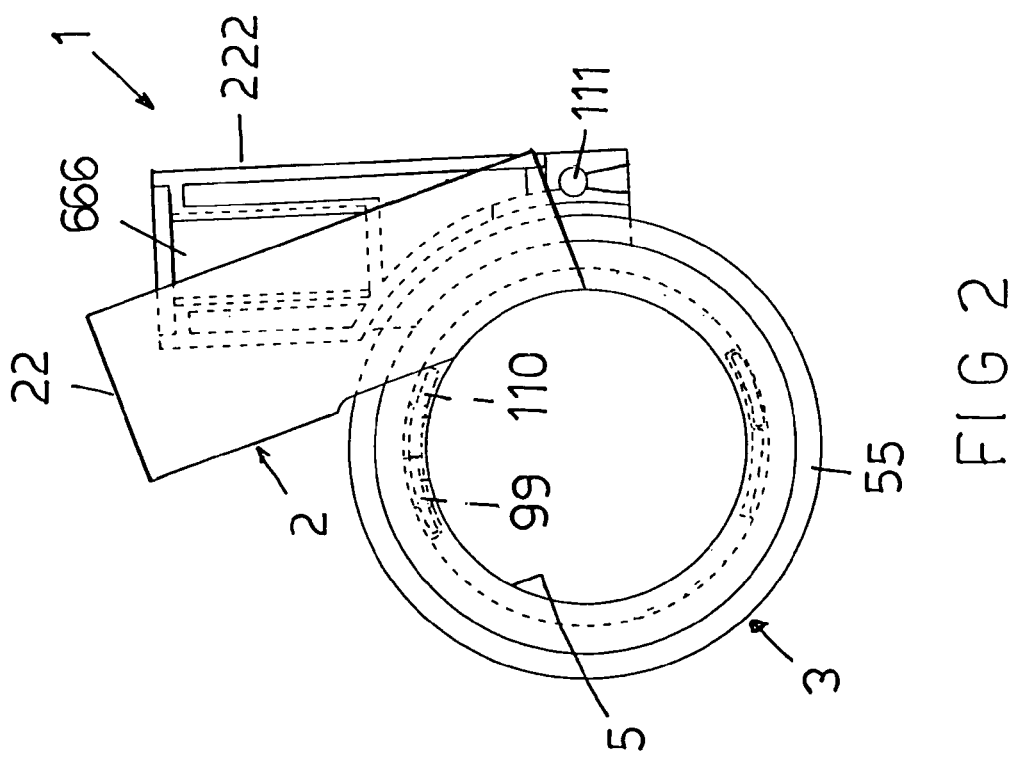

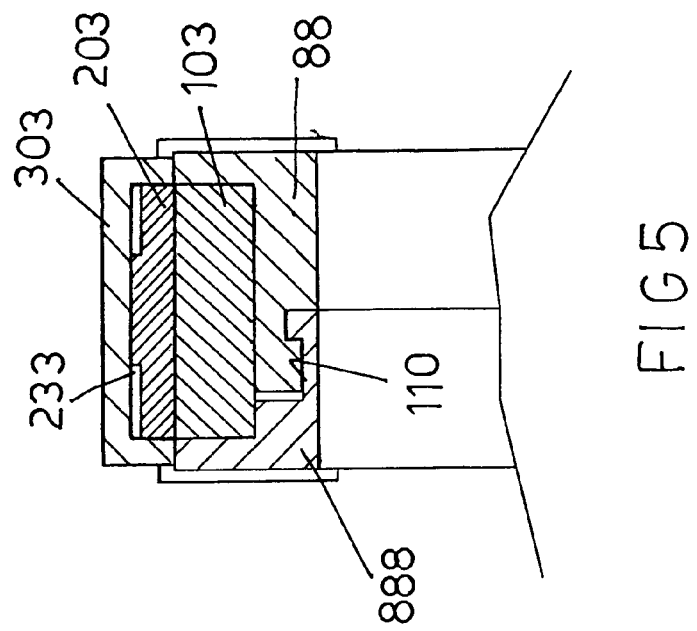
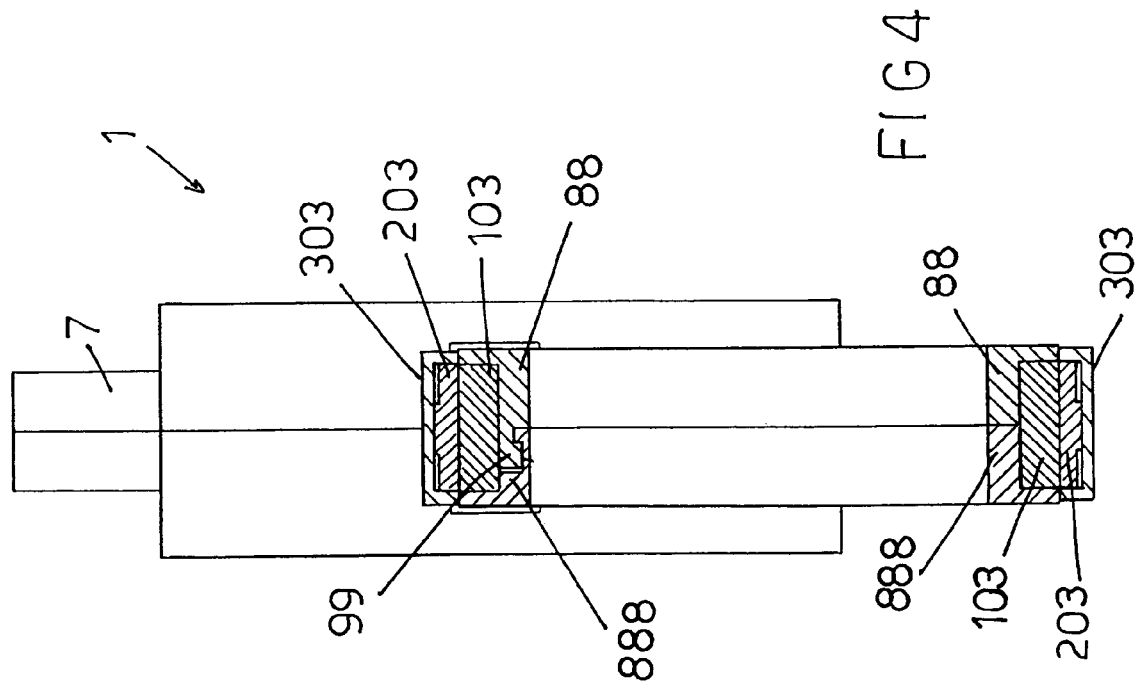
FIG 5
FIG 4

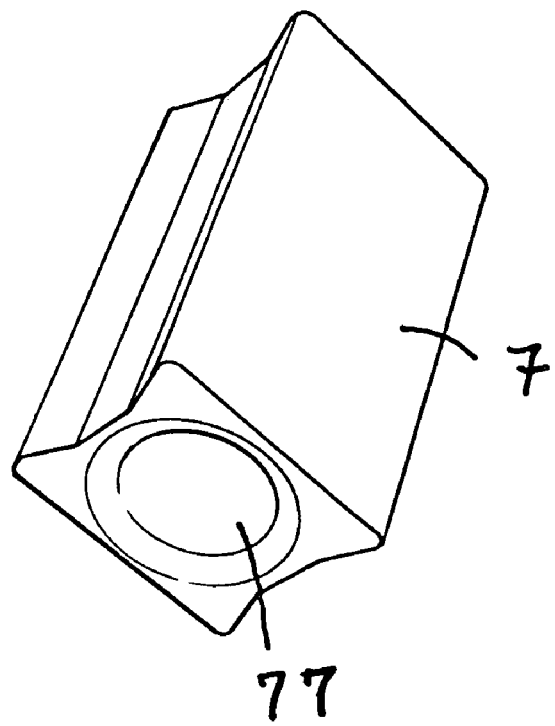
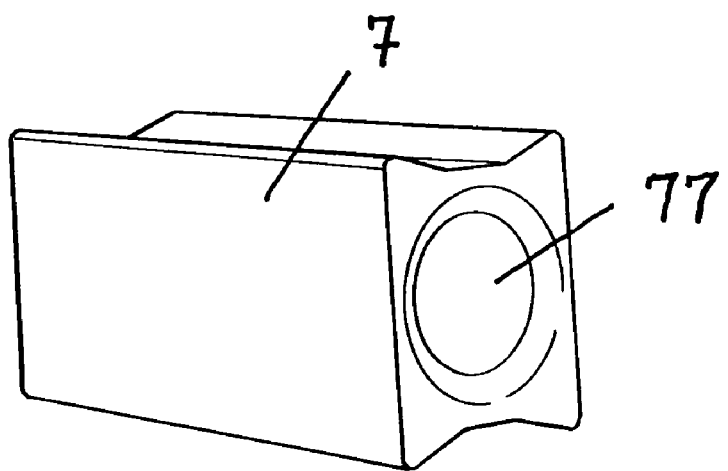
FIG. 9

HUBLESS CASTOR WHEEL CONSTRUCTION, PARTICULARLY FOR FURNITURE ARTICLES

BACKGROUND OF THE INVENTION

The present invention relates to an improved hubless castor wheel construction, specifically designed for connection to furniture articles and the like.

The castor wheel according to the invention can be specifically used for easily driving furniture articles or pieces, such as chairs, tables, desks, hand-actuated carriages for transporting materials, such as shopping carriages.

As is known, available prior tilting or castor wheels can be conventionally divided into two types.

The first provides to use a single wheel element including, at the center thereof, a rotary axis cooperating with a supporting element which is in turn coupled to a furniture piece or carriage through a pin allowing the wheel assembly to turn about a substantially vertical axis, thereby allowing the furniture piece or carriage to be displaced according to any desired directions.

The mechanisms of the above mentioned first type, however, have the disadvantage that the wheel assembly thereof encounters a resistance against its rotation about a vertical axis, thereby hindering a smooth movement of the furniture piece or carriage to which the wheel assembly is coupled is hindered.

Actually, to allow the wheel assembly to evenly turn about its vertical axis, the wheel must be capable of rotating about a line passing through the contact point of the wheel and the floor.

On the other hand, a peripheral portion of the wheel tends to drag on the floor, instead of freely turning.

Moreover, the wheel central rotary axis is fixed to the outside of the wheel by supporting elements which, as it is conventional, do not comprise protective means designed for protecting them against possible impacts with objects, such as other furniture pieces or walls, which impacts could damage or offset the wheel rotary axis and prevent an efficient operation of the wheel assembly.

The wheel assemblies of the second wheel type, in turn, comprise two wheel elements having a shared rotary axis, which is typically fixed to the wheel assembly supporting element at a middle position between the two wheels thereof, which wheels, however, are adapted to separately freely rotate, in particular in mutually opposite directions, thereby allowing the wheel assembly to easily turn about a pivot pin fixing the wheel assembly to the furniture piece or carriage, as disclosed for the first type, to further improve the direction switching evenness.

Moreover, in the second type of wheel assembly, the central axis support is arranged at the center of the supporting arrangement and between the two wheels, thereby protecting it against possible impacts and damages, to prevent the operating efficiency from being deteriorated.

However, a problem affecting the second type of wheel assembly, is the fixing system used for fixing or attaching the wheel elements to the central axis.

In fact, differently from the wheel assemblies of the first type, in which the central axis is fixed to the two opposite faces of the wheel, in the wheel assemblies of the second type, each wheel is respectively attached to an opposite end portion of the central axis, the axis support being arranged between the two wheels.

This attachment system is rather inefficient from a stability standpoint: in fact, since the axis does not pass through the wheel, the wheel load on said axis is asymmetrical and, in particular, maximum near the wheel inner part joined to the axis and minimum, or zero, outside of the wheel.

The above mentioned stability lackness generates, as can be easily found by examining a wheel assembly of this type, a comparatively high clearance between the wheels and central axis, which not only causes an inefficient operation of the wheel assembly, but, moreover, negatively affects the construction quality of the overall furniture article or carriage the wheel assembly is applied to.

Moreover, both the above mentioned castor wheel types have yet further drawbacks, since their strength limits or properties directly depend on the assembling procedure thereof.

With respect to the wheel assembly including a single wheel element, the strength limits are due to the fact that the supporting element is usually anchored only to a side of the wheel, with a consequent objectable great inclination of the central axis of the wheel, preventing the latter from properly turning as it impacts against an obstacle.

With respect to the second type of wheel, including two wheel elements having a single shared pivot axis fixed to a central support element, the small strength of the wheel to impacts and wear is due to the assembling system, anchoring one of the two wheels to the central support, and to the other wheel, by a latching or locking system arranged on a side disc element of the opposite wheel susceptible to be anchored to the first.

In the most common prior arrangements, the wheel turns about its pivot axis, the rotary movement being permitted by the very low friction coefficient between the wheel element and axis.

Since the diameter of the wheel with respect to the rotary axis engaging hole is typically very large, then, the torque on the axis-wheel coupling hole will be in turn very great.

Thus, it has been found that, upon an extended use of such a wheel assembly, friction will progressively remove material from the hole, to enlarge the latter, to cause an unstable rotation of the wheel on said axis, and an inefficient operation of the wheel assembly.

Moreover, if the rotary speed of a wheel is a comparatively low and said wheel bears a comparatively large load, the adoption of a central pivot axis does not represent the most efficient approach.

In fact, the rotary wheels provide, as they turn, a torque about a line passing through the center of the wheel and perpendicular to the movement direction, since the force on the wheel, at its floor contact point, is multiplied with its distance from the rotary axis, i.e. the wheel radius.

This torque represents an additional load on the wheel/axis assembly, thereby further decreasing the stability of the wheel assembly.

In this connection it should be pointed out that castor wheels designed for overcoming some of the above mentioned drawbacks have been recently designed.

Such a wheel assembly substantially comprises a supporting element having an inner annular or ring-like portion thereabout turns a toroidal wheel through an interposition of sliding elements.

Said sliding elements, which can comprise either balls or rollers, are arranged in suitable sliding recesses formed both on the inner annular portion and on the toroidal wheel inner portion.

Thus, owing to their front arrangement, they hold inside the wheel assembly the sliding elements to allow them to properly operate.

However, for making the above construction, it is necessary to provide said recesses which must be specifically machined to provide a precise coupling, thereby inevitably increasing the making cost and, consequently, the selling cost of the wheel assembly, with a consequent reduction of the related profit spread.

Moreover, as the above mentioned hubless wheel assembly is used through an extended period of time, the sliding elements tend to damage the contours of said recesses, to enlarge them, thereby increasing the clearance between the inner annular element and toroidal wheel, to consequently further decrease the stability of the wheel assembly.

SUMMARY OF THE INVENTION

Accordingly, the aim of the present invention is to provide an improved castor wheel construction overcoming the above mentioned drawbacks of the prior art.

Within the scope of the above mentioned aim, a main object of the invention is to provide such a castor wheel construction which can be made in a manner more economic, quick and simple than castor wheels produced by conventional making methods.

Yet another object of the invention is to provide such a castor wheel construction which can efficiently operate for a long operating time.

According to one aspect of the present invention, the above mentioned aim and objects, as well as yet other objects, which will become more apparent hereinafter, are achieved by an improved castor wheel construction, particularly for furniture articles and the like, characterized in that it comprises a rotary element pivotably supported by a support element to be coupled to a furniture article.

Said support element comprises two half-shells, which can be coupled by locking means and are adapted to define an upright which can be associated to a connection means for connection to the furniture article, and an annular attachment for said rotary element.

BRIEF DESCRIPTION OF THE DRAWINGS

Further characteristics and advantages of the present invention will become more apparent hereinafter from the following detailed disclosure of a preferred, though not exclusive, embodiment of the invention which is illustrated, by way of an indicative, but not limitative, example in the accompanying drawings, where:

FIG. 1 is a partially cross-sectioned side elevation view showing the castor wheel construction according to the present invention;

FIG. 2 is a view similar to FIG. 1, but showing the subject castor wheel construction during the assembling thereof;

FIG. 4 is a front cross-sectional view of the castor wheel construction;

FIG. 5 is a further front cross-sectional view of a detail, shown on a scale enlarged with respect to that of FIG. 4;

FIG. 9 is a view showing the contoured bush 7 operating as a coupling element.

DESCRIPTION OF THE PREFERRED EMBODIMENTS

Figure 3:
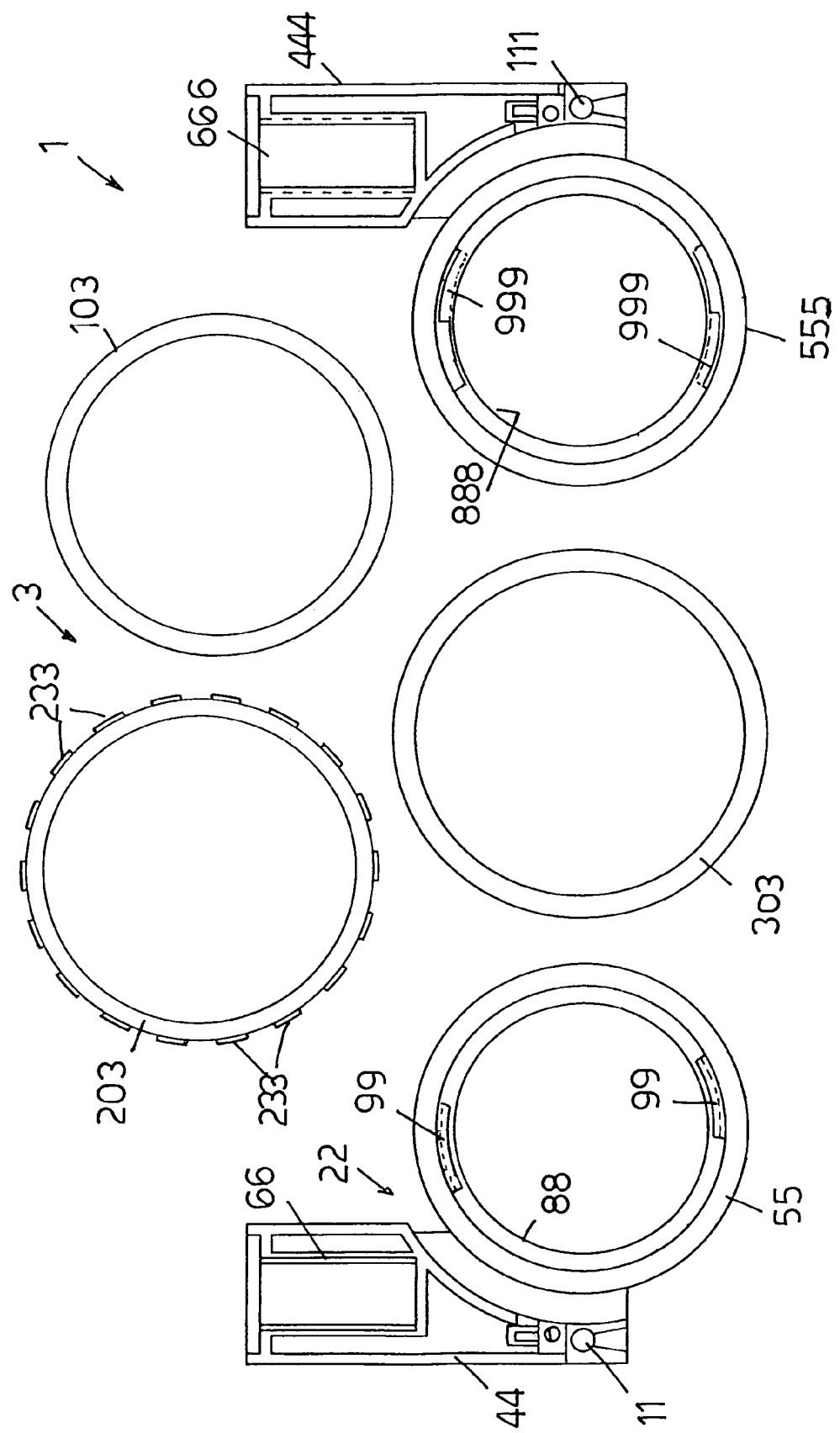
FIG. 3 is an exploded view showing the castor wheel construction according to the invention.

With reference to the number references of the above mentioned figures, the castor wheel construction according to the invention, which has been generally indicated by the reference number 1, comprises a support element 2 for an annular or ring-like rotary element 3.

The support element 2 comprises two mirror-like half-shells, respectively indicated by the reference numbers 22 and 222 which, upon assembling to one another, define an upright 4 to be coupled to a furniture piece or other article to be supported, and an annular attachment 5 for the rotary annular element 3.

More specifically, each half-shell 22, 222 comprises an annular portion 55, 555 made as a single-piece with a half-upright 44, 444.

Each half-upright 44, 444 defines a recess 66, 666 which vertically extends and is designed to form a prismatic or conic seat 6, upon assembling the half-shells, adapted to house a coupling means 7 therein.

Said coupling means, in particular, can comprise a contoured bush element designed to allow the castor wheel 1 according to the invention to be coupled to a furniture article or carriage, not specifically shown.

The bush element 7 is advantageously contoured as a double dovetail element, mating with the seat 6 defined by coupling the half-uprights 4 and 44, and comprises an axially extending hole 77 for receiving therein a coupling pin.

Each annular portion 55, 555 comprises an annular edge portion 88, 888.

Figure 8:
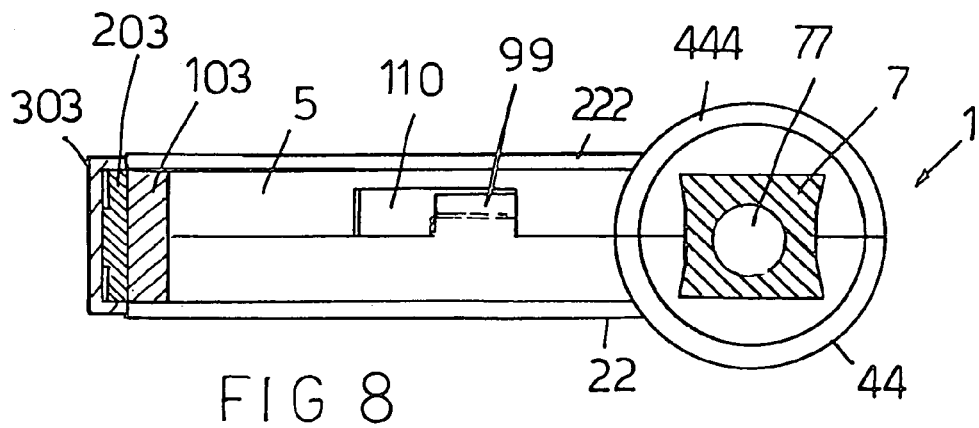
Figure 10:
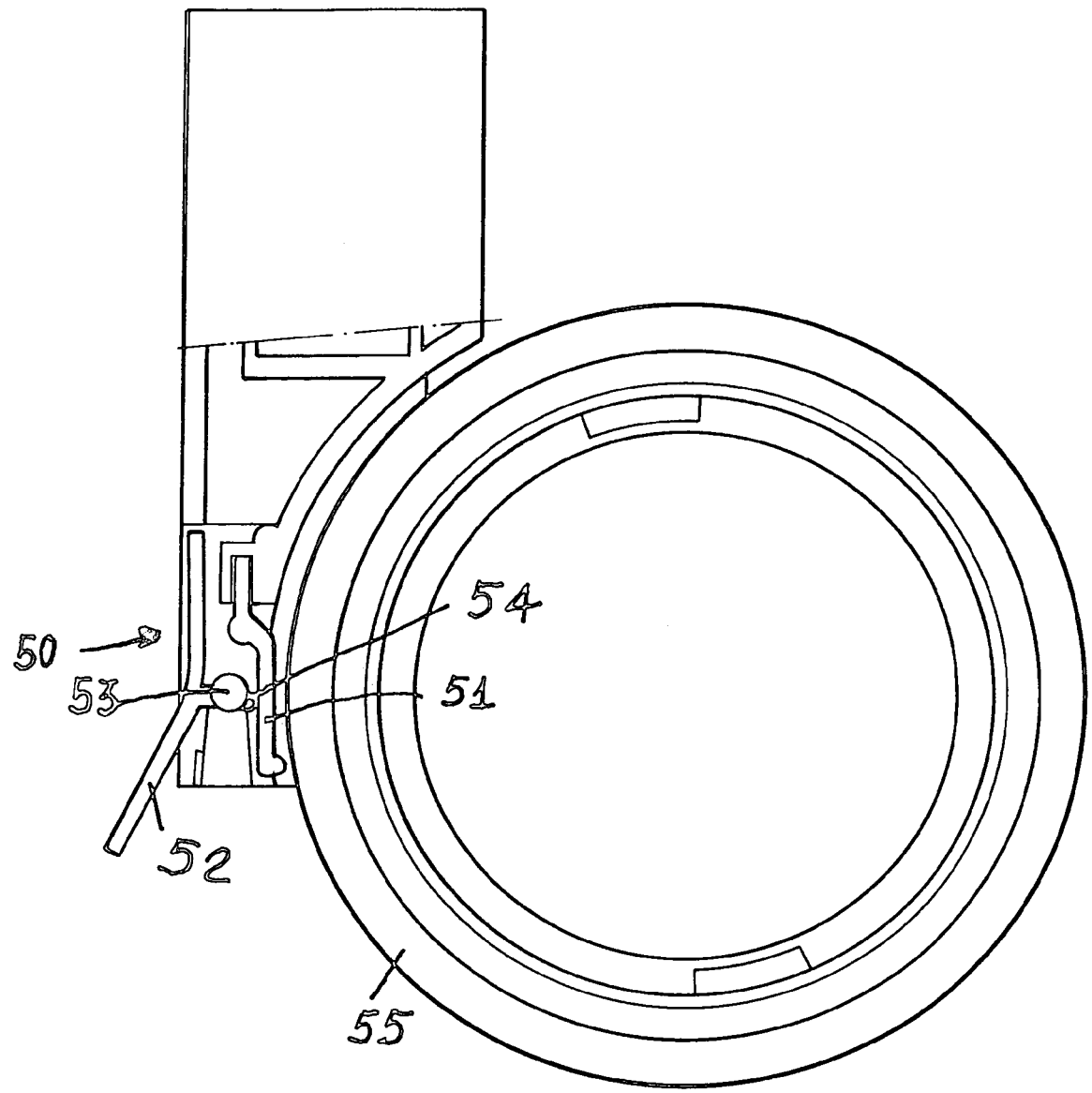
FIGS. 10 and 11 show braking elements designed for application to the castor wheel according to the invention.
Figure 11:
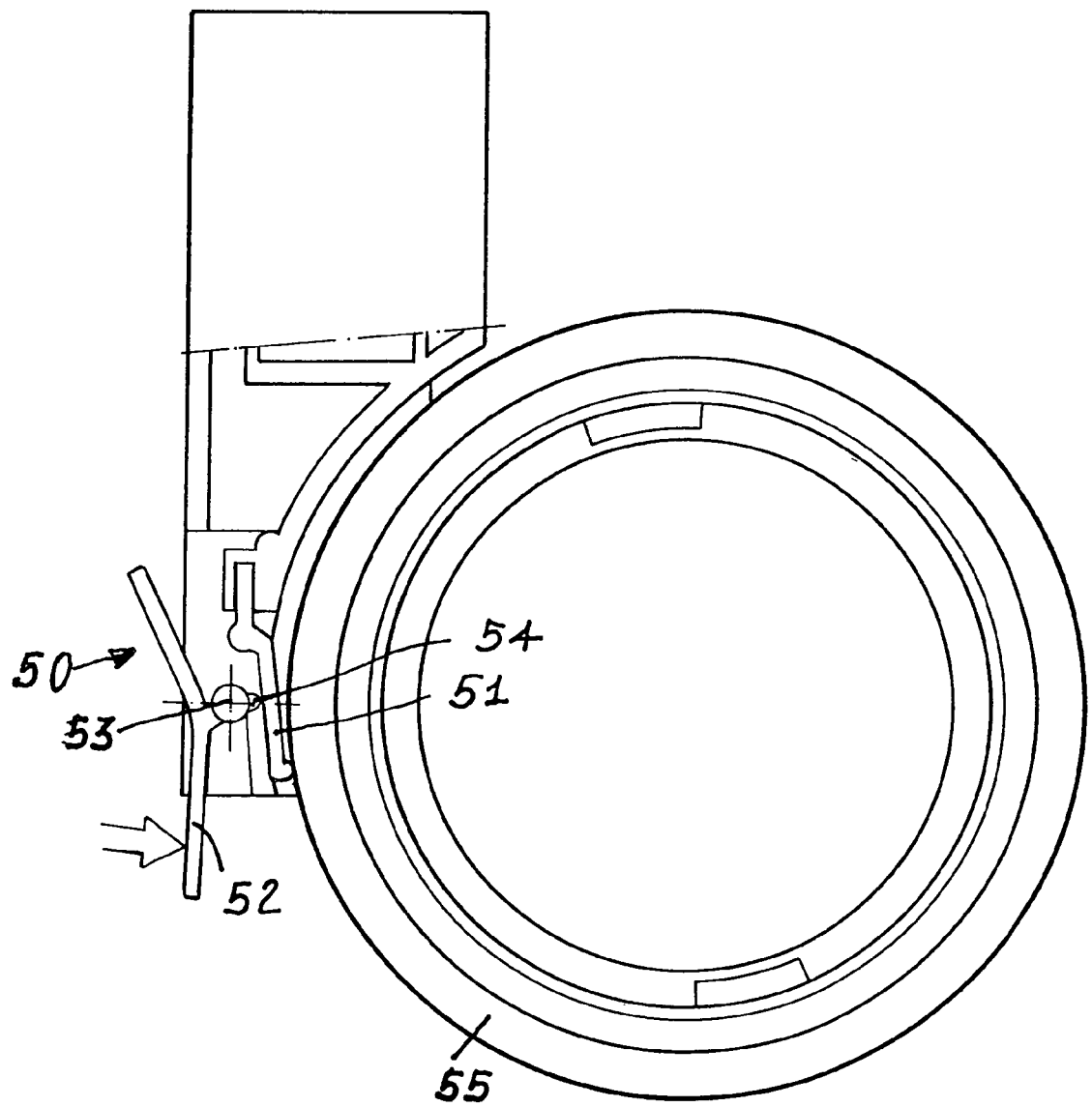

The bush element 7 also operates to prevent the two half-shells from turning and, accordingly, to prevent the wheel from being disassembled, as is shown in FIG. 8.

In their assembled condition, the edge portions 88 and 888 abut onto one another, as is clearly shown in FIGS. 4 and 5, and comprise locking means designed for providing a stable coupling of the two half-shells.

Preferably, said locking means comprise a bayonet type of coupling.

More specifically, the bayonet coupling or attachment comprises a plurality of teeth 99 formed on the annular edge portion 88, adapted to engage with respective seats 110 formed on the annular edge portion 888 of the other half-shell.

The half-uprights 44, 444, moreover, are each provided with respective holes 11, 111 for housing a braking device therein.

In this connection it should be pointed out that the rotary movement can also be prevented by other locking means such as screws or bolts.

The rotary annular element 3 is preferably constituted by an inner ring element made of a self-lubricating material 103, on which is mounted a rubber bearing rim 203, including a plurality of teeth 233 for fixing a rubber annular element 303.

The rubber bearing rim 203 is designed for supporting a rubber annular element 303, forming a tread portion of the rotary annular element or, more specifically, wheel 3.

The wheel construction according to the invention can be assembled in a very simple and quick manner.

Figure 6:
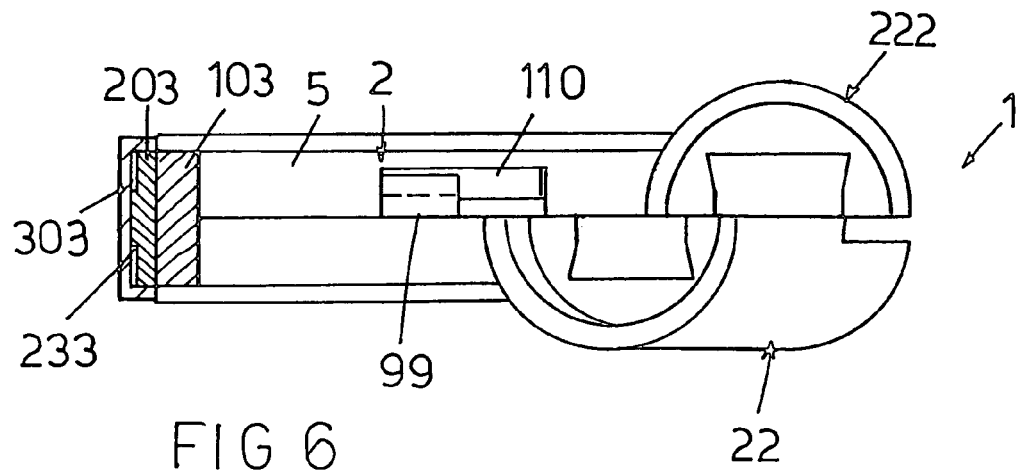
FIGS. 6-8 are partially cross-sectioned top plan views showing assembling steps for assembling the castor wheel construction according to the invention.
Figure 7:
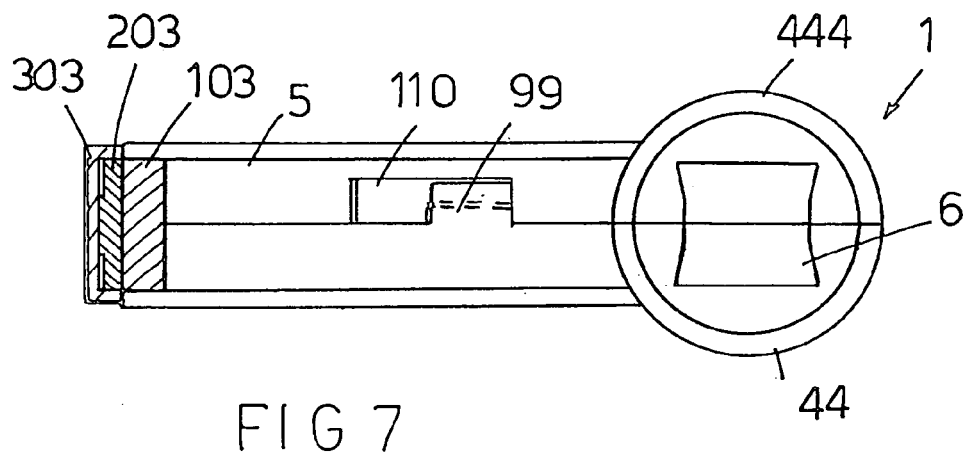

As is clearly shown in FIGS. 6-8, the wheel construction is assembled by arranging the wheel 3 between the two half-shells 22, 222 and by latching said half-shells by a partial rotary movement thereof, thereby allowing the two half-uprights 44, 444 to mate one against the other.

In the thus formed seat or recess 6 it is possible to engage the mentioned contoured bush element 7 to apply the wheel assembly to the furniture article by a pin threaded through the axial hole 77 of said bush element.

In particular the seat 6 and/or contoured bush element 7 can have a tapering configuration to provide an interference type of coupling.

The annular portion 55, 555 is provided for supporting the annular rotary element concentrically therewith.

The rotary movement is obtained by mutually sliding the inner surface of the rotary element on the circular edge of the annular support about a horizontal rotary axis.

To allow such a rotary movement with a very low friction coefficient, at least the circular edge or rim portion is preferably made of a self-lubricating material.

Moreover, the rotary movement can be obtained by using sliding devices, rolling sliding devices, such as roll or ball bearings.

The above mentioned self-lubricating material can comprise, for example, the material "Derlin 100", made by the Company DuPont, having very high resistance values against stress and fatigue and very low friction coefficients.

For saving purposes and rationalizing the making processes, it is also possible to make the overall supporting element of the same self-lubricating material.

Alternately, the surfaces of the annular support and circular rim portion operatively contacting the rotary element 3 can be coated by a suitable coating material, of a low friction coefficient, such as "Teflon".

The inner ring element of the rotary element is preferably made of a self-lubricating material or can comprise a low friction coefficient material on its inner surface.

The castor wheel construction according to the present invention can moreover advantageously comprise a braking device 50 including a braking element 51 operating on the rotary element 55 through a drive or control lever 52 which can be controlled by a foot.

Said drive or control lever 52, in particular, can swing about a pivot pin 53 and is provided with an eccentric tooth 54 urging the braking element 51 against the rotary element 55, as the drive or control lever 52 is driven by a foot.

In a per se known manner, said drive lever defines two stable positions, i.e. a locking position and an unlocking position.

The present invention allows to quickly and simply assemble a castor wheel having a strength greater than that of prior castor wheels, due to the use of a single supporting element formed by coupling two half-shells and a single wheel.

It has been found that the invention fully achieves the intended aim and objects.

A further advantage of the present invention is that, by using built-in sliding element, it is not necessary to provide sliding recesses, thereby the castor wheel assembly can be made in a very economic, quick and simple manner, while allowing the made castor wheel to operate in a very reliable and efficient manner.

In practicing the invention, the used materials, as well as the contingent size and shapes, can be any, depending on requirements and the status of the art.

The invention claimed is:

1. A hubless castor wheel for a furniture article, said castor wheel comprises:
    an annular rotary element pivotally supported by a support element,
    a coupling means to couple the support element and the annular rotary element to a piece of furniture, said coupling means comprising a tapering bush element and having a double dovetail configuration,
    said support element comprising two half-shells, each half-shell comprising as a single piece an annular portion coaxial to an axis of rotation of the annular rotary element and an upright element formed perpendicularly to the axis of rotation of the annular rotary element, each annular portion having an annular edge portion, each upright having a semi-circular cross-section defining a respective vertical recess, such that when the two half-shells are joined the uprights have a circular cross-section and the respective vertical recesses form a conic seat to receive said tapering bush element,
    the two half-shells are substantially mirror images of one another, the two half-shells are firmly coupled to one another by a bayonet locking means, said bayonet locking means comprising a plurality of teeth formed on the annular edge portion of one of said half-shells and respective seats formed on the other of said half-shells,
    wherein in an unassembled position, the two upright elements are offset from one another and the annular portion of the support elements are aligned coaxially, the annular edge portions abut one another, the half-shells are then turned with respect to one another in such a way that the two upright elements are aligned and allow the plurality of teeth to lock with their respective seats, the tapering bush element is then inserted into the conic seat to prevent the half-shells from disengaging one another.

2. A castor wheel, according to claim 1, wherein each said half-shell has a hole for housing a braking device therein, wherein said braking device comprises a braking element controlled by a driving lever, to be actuated by a foot, defining a first stable locking position in which said annular rotary element is locked and a second stable unlocked position in which said annular rotary element is unlocked, and wherein said driving lever is swingable about a pivot pin and comprises an eccentric tooth element urging said braking element against said annular rotary element as said drive lever is driven by said foot.

3. A castor wheel, according to claim 1, wherein said annular rotary element comprises an inner ring, thereon is mounted a rubber bearing rim element including a plurality of tooth elements supporting a thread rubber annular element.

* * * * *

UNITED STATES PATENT AND TRADEMARK OFFICE
CERTIFICATE OF CORRECTION

PATENT NO. : 7,657,969 B2
APPLICATION NO. : 11/411288
DATED : February 9, 2010
INVENTOR(S) : Trivini It is certified that error appears in the above-identified patent and that said Letters Patent is hereby corrected as shown below:

On title page Item (73) delete and insert
Assignee: O.G.T.M. - Officine Meccaniche S.r.l.
S. Angelo Lodigiano (Lodi) (IT) --

Signed and Sealed this

Twentieth Day of April, 2010

David J. Kappos
*Director of the United States Patent and Trademark Office*